R. PORTNER.
Beer Cooler.
No. 202,049. Patented April 2, 1878.
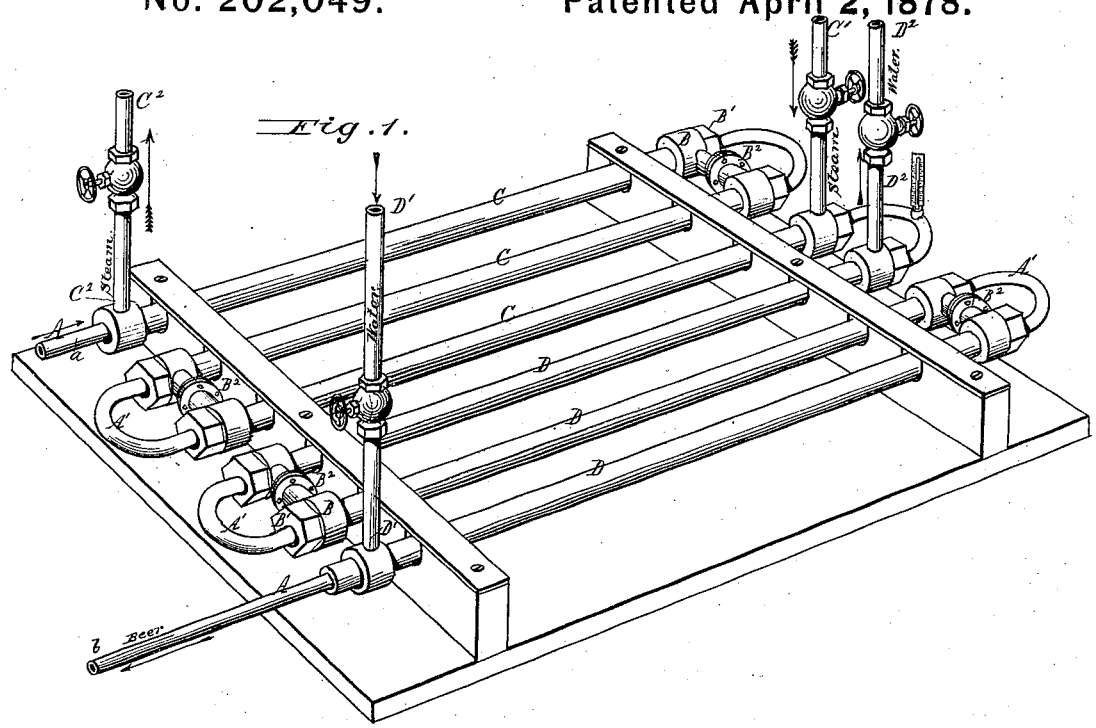
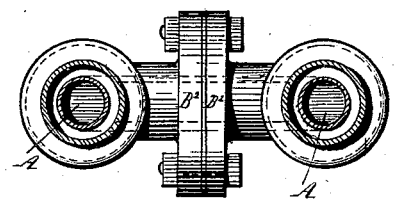
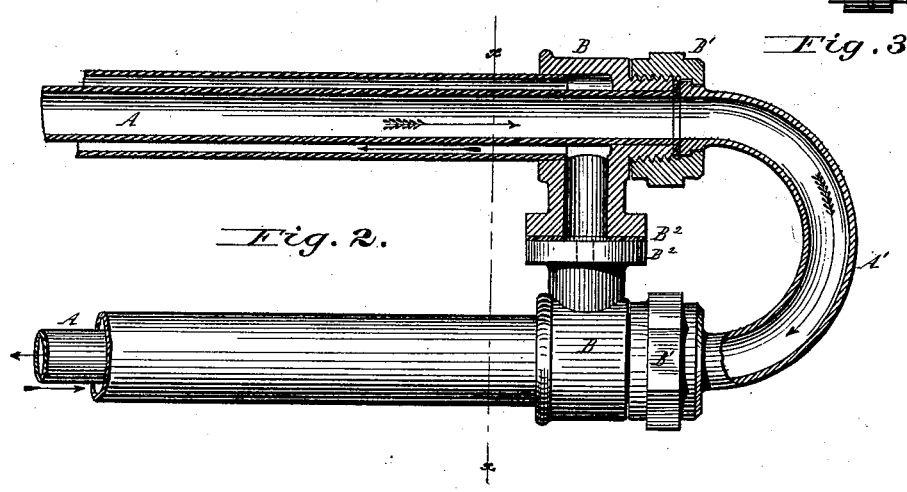
Attest:
H. L. Perrine
Chas. A. Neale
Robt. Portner.
Inventor.
By
Atty.

UNITED STATES PATENT OFFICE.

ROBERT PORTNER, OF ALEXANDRIA, VIRGINIA.

IMPROVEMENT IN BEER-COOLERS.

Specification forming part of Letters Patent No. 202,049, dated April 2, 1878; application filed February 15, 1878.

*To all whom it may concern:*

Be it known that I, ROBERT PORTNER, of Alexandria, in the county of Alexandria and State of Virginia, have invented a new and useful Improvement in the Art of Preserving Beer and other Fermented Liquors, and in apparatus employed therefor, of which the following is a specification:

Fermented liquors, and more especially beers, intended for shipment and for use in warmer climates are now generally preserved by first heating the same to the necessary temperature—say, 50° Reaumur—for destroying the active principle of the yeast fungus, and then again cooling them down to the original normal temperature. This general process has been practiced in a variety of ways in open vessels and in closed vessels; but the process has heretofore always been conducted with comparative slowness in practice. Beer thus treated undergoes a change in taste for the worse, and it has been ascertained by experiments that this change in taste is more or less decided according as this process is conducted more or less rapidly.

The main object of my invention is to provide a method and means for preserving beer and other fermented liquors by heating and again cooling the same with great rapidity, so that the taste thereof may be affected as little as possible.

My improvement in the process consists in successively heating and cooling beer or other fermented liquors while running in a continuous stream through pipes or other closed vessels.

My apparatus for practicing my improved process consists of a continuous pipe for conducting the beer or other fermented liquor, one section or portion of which is inclosed by a pipe or pipes for the passage of steam or other preferred heating agent, while the other section or portion thereof is similarly inclosed by a pipe or pipes, for the passage of cold water or other preferred cooling agent.

In the accompanying drawings, Figure 1 is a perspective view of the apparatus for practicing my improved process of preserving beer or other fermented liquors. Figs. 2 and 3 are detail views of the same on a larger scale.

The same letters of reference are used in all the figures in the designation of identical parts.

The apparatus shown consists of a series of parallel pipes, A, the adjacent ends of which are connected by turns A', so as to constitute one continuous pipe for the passage of the beer or other fermented liquor to be treated. Beer is introduced at the end $a$, and discharged at the end $b$. The pipes A terminate in couplings B, to which the turns are secured by nuts $B^1$. The drawing shows the apparatus as consisting of six pipes, A. Three of these are surrounded by steam-pipes C, the ends of which are secured in the larger ends of the couplings B, while the other three are surrounded by water-pipes D, the ends of which are similarly connected to the couplings B, in the manner illustrated in Fig. 2. The appropriate couplings are provided with flanged branches $B^2$, so that they can be united in order to form continuous, but separate, conduits of the pipes C and D, respectively, for steam and for water.

Steam is introduced through a pipe, $C^1$, and, flowing through pipes C in a direction contrary to the flow of the beer, escapes through pipe $C^2$ at the point where the beer enters the apparatus. Cold water enters through pipe $D^1$ at the point where the beer leaves the apparatus, and flows through pipes D, also in a direction contrary to the flow of the beer, to the pipe $D^2$, where it escapes.

Near the point where the steam enters the apparatus the beer-pipe is provided with a thermometer, to indicate the temperature of the beer. Another thermometer may be applied to the beer-pipe at or near the point where the beer escapes. By these thermometers the admission of steam and the required temperature of the ingoing current of water can be readily determined, so that the beer may be successively heated and cooled to the desired degrees of temperature.

It will be best, probably, to increase the difference between the size of the beer-pipe and the water-pipe over that existing between the beer-pipe and the steam-pipe, so that the beer-pipe may be surrounded by a thicker body of water than of steam. This will facilitate rapid cooling and save steam.

It is obvious that my process may be practiced by the aid of apparatus different from the apparatus which I have described; also, that heating and cooling agents other than steam and water can be used to effect the successive heating and cooling of beer or other fermented liquors to be preserved in that way.

It will be observed that the beer remains closely confined from the beginning to the end of the process, and that it will not, therefore, lose any of its carbonic-acid gas while under treatment for its preservation according to my invention.

The apparatus I have described, when not needed for preserving purposes, may be used as a cooler, in which case it might be well to temporarily connect pipes $C^1$ and $D^2$, so as to get the benefit of the whole of the apparatus.

What I claim as my invention, and desire to secure by Letters Patent, is—

1. The method of lessening the deterioration of beer or other fermented liquors incident to heating and cooling them for preserving purposes, consisting of successively heating and cooling the same while flowing in a continuous stream through a pipe or pipes or other closed vessels, substantially as specified.

2. The combination, substantially as specified, of the continuous pipe for beer or other fermented liquor, the heating-pipe C, surrounding one section or portion thereof, and the cooling-pipe D, surrounding the other section or portion thereof, so that the beer, on flowing through the apparatus, will be heated during the first part of its passage and cooled during the remainder.

In testimony whereof I have signed my name to the foregoing specification in the presence of two subscribing witnesses.

ROBERT PORTNER.

Witnesses:
  CHAS. A. NEALE,
  B. E. J. EILS.